United States Patent
Tench

(10) Patent No.: US 7,022,210 B2
(45) Date of Patent: Apr. 4, 2006

(54) LOCALLY-DISTRIBUTED ELECTRODE AND METHOD OF FABRICATION

(75) Inventor: D. Morgan Tench, Camarillo, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 505 days.

(21) Appl. No.: 10/211,494

(22) Filed: Aug. 1, 2002

(65) Prior Publication Data

US 2004/0020767 A1 Feb. 5, 2004

(51) Int. Cl.
C25B 11/00 (2006.01)

(52) U.S. Cl. .............. 204/290.14; 204/291; 205/205; 205/223; 205/225; 205/247; 205/257; 205/264; 205/265; 205/266; 359/265; 359/266; 359/267; 359/269; 359/271

(58) Field of Classification Search ........... 204/291, 204/290.01, 290.14, 290.08; 359/265, 266, 359/267, 269, 271; 205/205, 223, 225, 247, 205/257, 264–266

See application file for complete search history.

(56) References Cited

U.S. PATENT DOCUMENTS 6,798,556 B1 * 9/2004 Tench et al. ................ 359/269

* cited by examiner

Primary Examiner—Bruce F. Bell
(74) Attorney, Agent, or Firm—D. Morgan Tench; John J. Deinken; David J. Zoetewey

(57) ABSTRACT

A locally distributed electrode is made by placing a conducting metallic oxide layer and a counter electrode in contact with a noble metal electroplating solution and applying a negative potential to the metallic oxide layer relative to the counter electrode, such that the noble metal is electrodeposited from the solution preferentially at defect sites on a surface of the metallic oxide layer. The noble metal nuclei are selectively electrodeposited at the defect sites to form a locally distributed electrode made up of a dot matrix of metallic islands. For reversible electrochemical mirror (REM) devices, the presence of the noble metal renders mirror metal electrodeposition at the defect sites reversible so that the defects become part of the dot matrix electrode and extraneous deposition of the mirror metal on the conducting metallic oxide is avoided. This method avoids the use of expensive photolithography, is readily scalable to large areas, and produces electrodes that offer the optimum compromise between high current carrying capability and high light transmission.

22 Claims, 2 Drawing Sheets

LOCALLY-DISTRIBUTED ELECTRODE AND METHOD OF FABRICATION

CROSS-REFERENCE TO RELATED APPLICATIONS

This application is related to U.S. Pat. Nos. 5,903,382, 5,923,456, 6,111,685, 6,166,847, 6,256,135, 6,301,039 and 6,400,491, and to U.S. patent application Ser. No. 10/066,210, filed Jan. 31, 2002 (entitled "Reversible Electrodeposition Device with Ionic Liquid Electrolyte"), all of which are assigned to the assignee of the present application. The teaching of each of these patents and patent applications is incorporated herein by reference.

BACKGROUND OF THE INVENTION

1. Field of the Invention

This invention is concerned with fabrication of locally distributed electrodes that are particularly useful in smart windows for controlling the reflectance and transmission of electromagnetic radiation.

2. Description of the Related Art

Smart windows are designed to reduce the amount of energy consumed for climate control of buildings and transportation vehicles by controlling the amount of solar radiation which is transmitted into such buildings and vehicles, which produces interior heating via the greenhouse effect. However, the electrochromic smart window devices which are known in the prior art have narrow dynamic ranges and involve light absorption in operation, resulting in heat being generated and transferred into the interior space by conduction, convection and infrared radiation. In addition, electrochromic devices typically utilize a relatively slow ion insertion electrochemical process that limits switching speed and cycle life. Heating of electrochromic devices by light absorption further reduces the device lifetime. Other types of smart windows, such as liquid crystal and suspended particle devices, also have limited dynamic range and typically have the added disadvantage of requiring a continuously applied voltage to maintain a given transmissive state. Consequently, an important need has developed for a durable, low-power smart window with reflectivity variable over a wide range. A smart window device based on light reflection would be much more efficient at preventing interior heating.

U.S. Pat. Nos. 5,923,456 and 5,903,382 to Tench et al. describe a reversible electrochemical mirror (REM) smart window device that provides the adjustable light reflection, wide dynamic range, long cycle life and low power requirements needed for a high efficiency smart window. In a transmissive type REM device, a mirror metal is reversibly electrodeposited (from a thin layer of liquid or gelled electrolyte) on a transparent electrode to form a full or partial mirror which provides variable reflectivity. Conversely, the mirror metal is deposited on a locally distributed counter electrode (a metallic grid on glass, for example) to reduce the reflectivity and increase the amount of light transmitted. The mirror metal is preferably silver but may be another metal, such as bismuth, copper, tin, cadmium, mercury, indium, lead, antimony, thallium, zinc, or an alloy. The transparent electrode is typically indium tin oxide (ITO) or fluorine-doped tin oxide (FTO), with a thin layer of noble metal (e.g., 15 Å platinum) that serves as a nucleation layer so that suitably smooth, mirror deposits can be obtained. The transmission of visible light, with continuous variability from around 80% to complete blocking, has been demonstrated and higher transmission for some device configurations and switching conditions should be attainable. Intermediate mirror states provide good visibility and have a pleasing bluish-gray appearance. Very little voltage is required for switching REM devices, and no voltage is needed to maintain a given switched state. As described in U.S. Pat. No. 6,301,039 to Tench, the decrease in mirror electrode sheet resistance produced by deposition of mirror metal on the mirror electrode can be used to monitor the reflectance state of the REM mirror.

Commercialization of REM smart window devices has been hindered by the expense and performance of the locally distributed counter electrode, which must present a relatively small cross-sectional area to avoid excessive light blockage that would decrease the maximum transmission of the device. The current counter electrode approach is to use a grid of a noble metal (platinum with a chromium adhesion layer, for example) which is vacuum evaporated through a photolithographic mask onto a glass substrate. The photolithographic process is inherently expensive and not readily scalable to large areas. In addition, fine grid lines (<10 µm wide) are needed so as to be invisible to the eye, but grid lines of such size are prone to damage during the photoresist liftoff process, which further increases the fabrication costs. Fine grid lines also tend to produce light interference patterns that distort images seen through the window. Furthermore, grid lines, even with mirror metal deposited on them, are relatively flat so that their actual area and cross-sectional area are nearly the same. Consequently, the current carrying capability for such grids with good light transmission is very low (approximately 5–10% of that for the mirror electrode).

An alternative approach is to use a dot matrix counter electrode, which includes microscopic islands of an noble metal distributed over a layer of a transparent metallic oxide conductor (e.g., ITO or FTO) which serves as the current collector. In this case, the mirror metal is reversibly deposited on the noble metal islands. These islands could be produced in a random pattern without photolithography by sub-monolayer vacuum evaporation or sputtering, for example. Extraneous mirror metal deposition should not occur, since the potential required for metal deposition on the bare transparent conducting metallic oxide surface is generally greater than on noble metals and on typical mirror metals. For spherical islands, the surface area is roughly four times the cross-sectional area and the current carrying capability is further increased via spherical diffusion (which is significantly faster than planar diffusion). Sufficiently small islands would not be visible to the naked eye.

In practice, however, electrodeposition of silver is initiated at defect sites on bare ITO and FTO surfaces when the applied potential is less negative than that required for deposition on the bulk materials. The defect sites (probably associated with grain boundaries) are present at relatively low density, so that silver deposits produced at moderate potentials on bare ITO and FTO are not visible to the naked eye, even after passage of an amount of charge that would yield a highly reflective mirror on the platinized surfaces. Silver electrodeposition on bare ITO and FTO is also relatively irreversible, in the sense that the deposit is not readily stripped anodically from the surface (as indicated by slow decay in the anodic stripping current) and some of the deposited silver is permanently lost (as indicated by an anodic stripping charge that is less than the metal plating charge). This indicates that the electrical/mechanical connection of silver deposits to the ITO/FTO defect sites is weak, so that some of the deposited silver flakes off. Deposition of non-adherent silver at such defect sites must be effectively suppressed to enable long-term functioning of a REM dot matrix counter electrode. The behavior of other mirror metals and other transparent metallic oxide conductors is expected to be similar.

A dot matrix electrode for which extraneous deposition on the current collector material is adequately suppressed and an economical method for making such a dot matrix electrode are needed. Such counter electrodes would be particularly useful for reducing the cost and improving the performance of REM smart window devices, but could also be used for other applications. For example, the sensitivity of electroanalyses for solution species, which is greatly enhanced by spherical diffusion at nano-scale electrodes, could be further enhanced by use of an electrode comprised of a plurality of nano-scale electrodes for which the total measurement current would be much higher.

SUMMARY OF THE INVENTION

This invention provides a non-lithographic method for producing a dot matrix metallic electrode on a conducting metallic oxide layer and for suppressing extraneous electrochemical reactions at defect sites on the layer. The dot matrix electrode comprises islands of a noble metal (e.g., platinum) located at defect sites on a conducting metallic oxide layer. Such a locally distributed electrode is made by placing the conducting metallic oxide layer and a counter electrode in contact with a noble metal electroplating solution and applying a negative potential to the metallic oxide layer relative to the counter electrode, such that the noble metal is electrodeposited from the solution preferentially at defect sites on a surface of the metallic oxide layer. Preferential electrodeposition of nuclei of the noble metal on the defect sites is attained by utilizing an electrode potential which is less negative than that required for deposition of the noble metal on the remainder of the conducting metallic oxide surface. In this case, noble metal deposition is localized at the defect sites, which become part of the dot matrix electrode structure.

The noble metal nuclei can be grown into larger islands by continued electrodeposition of the same metal or a different metal (which may be a non-noble metal). The density of noble metal nuclei may be controlled via the preparation conditions for the conducting metallic oxide and by pretreatments that affect the density of defect sites. For example, the defect density may be decreased by annealing the metallic oxide at elevated temperatures and increased by abrading or etching the surface. Additional noble metal nuclei may be electrodeposited via a more negative nucleation pulse (possibly followed by further growth at a less negative potential) or may be deposited by sub-monolayer vacuum evaporation or sputtering (followed by growth via electrodeposition). Heat treatments may be used to improve the adhesion and electrical connection of the noble metal nuclei to the oxide and/or to decrease the reactivity of exposed transparent metallic oxide material. Thin layers of insulating materials may also be used to suppress extraneous reactions on the transparent conducting metallic oxide surface.

For REM smart window devices, the dot matrix counter electrode is preferably comprised of microscopic islands of noble metal covered with electrodeposited mirror metal that are distributed uniformly but randomly in a dot matrix over the surface of a continuous layer of transparent conducting metallic oxide. During mirror erasure to increase device transmission, mirror metal electrodeposition occurs preferentially on the metallic islands because of the higher potential required for deposition on the exposed metallic oxide surface, which serves as a current collector. Spherical diffusion of mirror metal ions to such microscopic islands provides much higher current carrying capability (compared to planar diffusion to larger grid lines), and results in nearly spherical electrodeposits. Spherical dot matrix electrodes also have a surface area that is roughly four times the cross-sectional area and thus provide an optimal trade-off between fast mirror switching and high maximum light transmission.

The method of the present invention is particularly useful for fabricating counter electrodes for REM smart window devices since it avoids the use of expensive photolithography and is readily scalable to large areas. In addition, the three-dimensional microscopic islands of the dot matrix counter electrode have greatly enhanced current carrying capability and, because of their small size and random distribution, are not visible to the naked eye and do not produce interference patterns. This invention could also be used to produce locally distributed electrodes for other applications. For example, electroanalytical sensitivity could be greatly increased by the higher total current for a dot matrix array of nano-scale electrodes compared to a single nano-scale electrode.

Further features and advantages of the invention will be apparent to those skilled in the art from the following detailed description, taken together with the accompanying drawings.

These figures are not to scale and some features have been enlarged for better depiction of the features and operation of the invention.

DETAILED DESCRIPTION OF THE INVENTION

Figure 1:
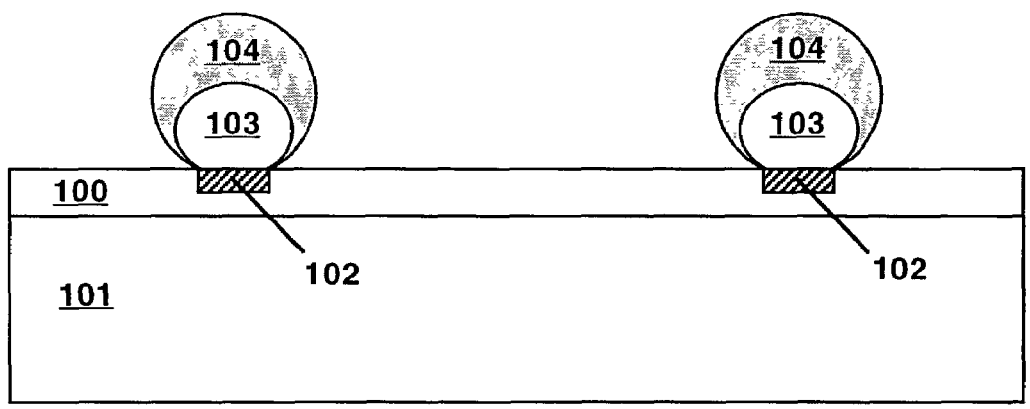
FIG. 1 is a schematic cross-sectional view of a REM dot matrix counter electrode formed by electrodeposition of a noble metal at defects on a metallic oxide conductor surface.

The present invention provides a dot matrix electrode comprised of islands of a noble metal (e.g., platinum) located at defect sites on a conducting metallic oxide layer. FIG. 1 shows a schematic cross-section of a REM dot matrix counter electrode according to the present invention. Defects 102 are randomly distributed over a surface of a transparent conducting metallic oxide layer 100 disposed on a glass or plastic substrate 101. The defects 102 are covered with noble metal nuclei 103. Mirror metal deposits 104 are reversibly electrodeposited on the noble metal nuclei 103. The density and size of the electrode islands comprised of noble metal nuclei 103 and mirror metal deposits 104 are sufficiently small to allow high transmission of visible light. For the nearly spherical islands shown in FIG. 1, the surface area, which is a limiting factor with respect to current carrying capability, is four times the cross-sectional area, which determines the percentage of light blocked by the electrode islands. Spherical diffusion of mirror metal ions to and from the electrode islands further enhances the current carrying capability compared to planar grid electrodes. In some cases, the nuclei 103 and/or the mirror metal deposits 104 are elongated in the vertical direction so that the ratio of surface area to cross-sectional area is increased further.

The mirror metal deposits 104 are typically applied to the noble metal nuclei 103 by electrodeposition, which may be performed from the REM electrolyte or from a separate electroplating solution. Typical mirror metals include silver, bismuth, copper, tin, cadmium, mercury, indium, lead, antimony, thallium, zinc, and alloys thereof. The counter electrode is typically comprised of the same metal as the mirror metal deposits 104 but may be comprised of another metal (a noble metal or stainless steel, for example) when a separate plating solution is employed.

The present invention further provides a method whereby noble metal nuclei are selectively electrodeposited at defect sites on a conducting metallic oxide layer, thereby forming the locally distributed electrode of the invention by creating a dot matrix of metallic islands. The presence of the noble metal renders electrochemical reactions at the defect sites reversible, so that problems associated with irreversible reactions are avoided. A variety of noble metals may be utilized, including platinum, iridium, gold, osmium, palladium, rhenium, rhodium, ruthenium, and alloys thereof. Platinum is preferred since it is known to adhere well to ITO and FTO surfaces. As the term is used in this context, a noble metal is one that does not dissolve or passivate in the electrolyte in which it is utilized as an electrode. In some cases, metals other than those normally considered to be noble could be used to form metallic islands according to the present invention. The word "defect" is used in a broad sense to include any difference in the structure or composition of the metallic oxide layer that causes or allows metal electrodeposition to occur on a defect at a less negative electrode potential than on the bulk metallic oxide surface. Defects in conducting metallic oxides are often associated with grain boundaries and impurities; their source, however, need not be known to practice this invention.

Conducting metallic oxides are utilized since they typically exhibit an appreciable overpotential for metal electrodeposition as well as good electrochemical stability (in many electrolytes). A wide variety of metallic oxide conductors may be employed, depending on the intended application and the electrolyte involved. For REM smart windows, the oxide layer must be substantially transparent to visible light. Indium tin oxide (ITO) and fluorine-doped tin oxide (FTO) are preferred for smart window applications but other transparent conductors may be used, including aluminum-doped zinc oxide, antimony-doped tin oxide, indium oxide, fluorine-doped indium oxide, aluminum-doped tin oxide, phosphorus-doped tin oxide, and indium zinc oxide. Preferably, the metallic oxide layer is disposed as a thin film on a glass or plastic substrate. The metallic oxide film is typically deposited by sputtering or spray pyrolysis. Bulk metallic oxide material may be used for some applications. For metallic oxide films, the sheet resistance is preferably low (around 10-$\Omega$/square) to minimize resistive voltage losses that may adversely affect the uniformity of electrodeposition (and other electrochemical processes) over the electrode surface.

In the method of the present invention, noble metal nuclei are preferentially electrodeposited at defects on the metallic oxide surface by utilizing an electrode potential that is less negative than that required for deposition of the noble metal on the bulk oxide material. At suitable electrodeposition potentials, little or no discoloration of the metallic oxide layer is observed after prolonged electrodeposition, whereas bulk deposition at excessively negative potentials produces visible darkening of the electrode within a few minutes. The noble metal electrodeposition potential is preferably chosen to be just below that which would produce bulk deposition to ensure that all potentially active defect sites are covered by the noble metal. At less negative potentials, the density of noble metal nuclei obtained may be lower. The noble metal nuclei can be grown into larger islands by prolonged electrodeposition of the noble metal or a different metal. For REM smart window devices, the counter electrode islands may be composed primarily of the mirror metal to minimize the amount of expensive noble metal used.

Any electroplating solution that is compatible with the metallic oxide material may be used to electrodeposit the noble metal nuclei. Electroplating solutions of near-neutral pH are preferred to minimize chemical attack of the metallic oxide layer.

The electrode potential during deposition of the noble metal nuclei is preferably controlled relative to a reference electrode via a counter electrode and an electronic potentiostat. The counter electrode is preferably a noble metal or another metal that is stable as an anode in the plating solution (e.g., stainless steel). Any suitable reference electrode may be used (saturated calomel or silver-silver chloride, for example). Alternatively, deposition of the noble metal nuclei may be performed at constant (or variable) cell voltage or current. In this case, a reference electrode may be used to ensure that the metallic oxide potential is appropriate.

The density and size of the counter electrode islands may be adjusted to provide the optimum electrode performance, which, for REM smart window devices, involves a compromise between fast switching and maximum light transmission (minimum light blockage). The density of counter electrode islands may be increased via pretreatments that increase the density of electroactive defects, including dangling chemical bonds, at the surface of the metallic oxide conductor material. Such pretreatments may include oxygen plasma cleaning, sputter cleaning, mechanical abrasion (via bead blasting or polishing, for example), and chemical etching. The density of counter electrode islands may also be increased by application of a short cathodic pulse (of a potential more negative than that required for deposition at defects) to nucleate additional noble metal growth sites on the metallic oxide conductor surface. If necessary, the size of the nuclei thus generated may be increased by further electrodeposition at a lower potential (so as to minimize generation of additional nuclei). The voltage and duration (typically in the µs range) of the cathodic nucleation pulse may be varied to control the density of noble metal nuclei generated. Additional noble metal nuclei may also be produced by vacuum evaporation or sputtering of submonolayer amounts of the noble metal. In this case, electrodeposition may be used to increase the size of the noble metal nuclei. The density of noble metal nuclei may be decreased by annealing the substrate at elevated temperatures to decrease the defect density. Typical annealing temperatures are in the range of 300° to 600° C. but higher or lower temperatures may be used. For REM devices, the maximum allowable annealing temperature is typically limited by the softening point of the glass or plastic substrate. Annealing may be performed under an inert atmosphere (argon or nitrogen, for example) to minimize changes in the conductivity of the metallic oxide layer.

In some cases, it may be desirable to improve the adhesion and electrical connection of the noble metal nuclei to the metallic oxide layer by appropriate heat treatments that, preferably, form a diffusion bond. For REM devices, the maximum allowable heat treatment temperature is typically limited by the softening point of the glass or plastic substrate. Heat treatment at about 500° C. for one hour has been found to produce appreciable diffusion of thin sputtered platinum into ITO and FTO surfaces. Alternatively, the adhesion and electrical connection of the noble metal nuclei may be improved via pretreatment of the metallic oxide conductor, by oxygen plasma or sputter cleaning, for example.

Figure 2:
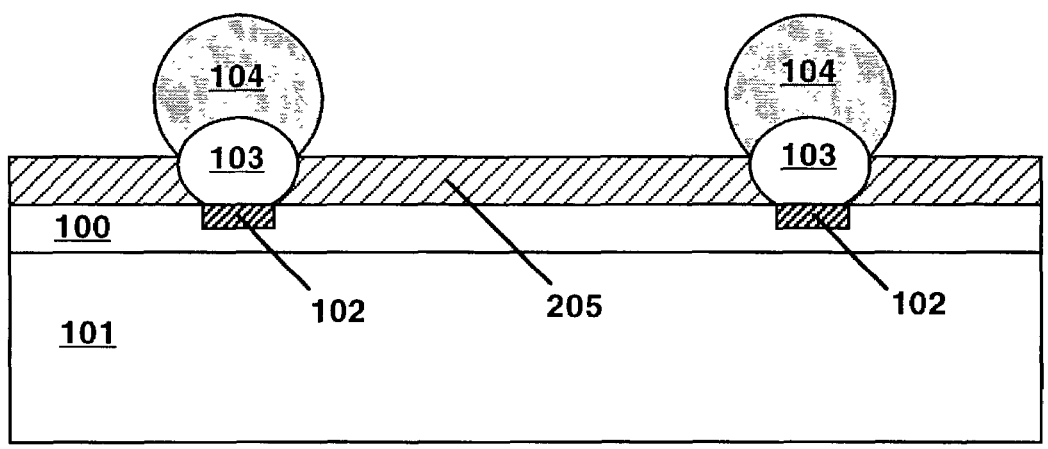
FIG. 2 is a schematic cross-sectional view of a REM dot matrix counter electrode similar to the electrode of FIG. 1 but employing a layer of insulating material to suppress the deposition of mirror metal on the metallic oxide conductor surface.

Additional suppression of extraneous electrochemical reactions on the bare metallic oxide surface may be needed for some conducting metallic oxide materials in some electrolyte systems. This may be accomplished via heat treatment of the dot matrix electrode to anneal out remaining defects in the metallic oxide surface or to form a surface layer of insulating material. Heat treatments in air are known to increase the sheet resistance of ITO films. As depicted in FIG. 2, a separate layer 205 of insulating metallic oxide (e.g., $SnO_2$) may be applied to conducting metallic oxide layer 100 to further suppress extraneous electrochemical reactions. Insulating layer 205 may be applied by sol-gel deposition, which involves spray coating the electrode with a solution containing dissolved metal ions and organic oxygen-containing species, followed by firing in air to produce the metal oxide. Preferably, noble metal nuclei 103 are relatively large in this case and the sol-gel solution is designed to preferentially wet the transparent metallic oxide conductor, so that the noble metal nuclei 103 are not completely covered by the sol-gel oxide layer. If necessary, mild abrasive polishing may be used to expose buried noble metal nuclei. An insulating metal oxide layer (e.g., $SnO_2$) may also be formed by deposition of a layer of the metal (e.g., Sn) by vacuum evaporation or sputtering, followed by thermal oxidation.

Fabrication of a Preferred Embodiment

The feasibility of forming a noble metal dot matrix counter electrode disposed on a transparent conducting metallic oxide layer by the method of the present invention was demonstrated for ITO and FTO films. Platinum nuclei were electrodeposited (using a Pt counter electrode) onto untreated 10-Ω/square ITO and FTO films on glass substrates (typically 1 cm×4 cm) from a plating solution operated at 70° C. and containing 10 g/L chloroplatinic acid, 60 g/L ammonium dihydrogen phosphate and sufficient ammonium hydroxide to adjust the pH to about 8. Platinum electrodeposition from this solution is a 4-electron process and is less than 50% efficient. Electrodeposition was typically performed at a constant current in the 0.2 to 0.8 mA/cm$^2$ range, which is below the current density that produces deposits visible to the naked eye (1 mA/cm$^2$). Electrodeposition from this solution at the lower current densities quickly produced a platinum-colored deposit on copper substrates but did not produce a visible deposit on ITO and FTO surfaces even after passage of 0.8 C/cm$^2$ of charge. Electrodeposition for some specimens was performed at a constant cathode voltage in the −0.37 to −0.52 V vs. SCE range, which also yielded deposits that were not visible to the naked eye. Electrodeposition at cathode voltages more negative than about −0.55 V vs. SCE did yield visible deposits. For electrodeposition at constant voltage, the plating solution was maintained at 70° C. but the SCE reference electrode was at room temperature (in a solution connected to the plating cell via a salt bridge).

EXAMPLE 1

After being subjected to platinum electrodeposition at 0.40 mA/cm$^2$ to 0.60 C/cm$^2$ of charge, FTO and ITO films were examined by scanning electron microscopy (SEM) and energy dispersive analysis of x-rays (EDAX). The FTO surface had more texture but a relatively uniform distribution of approximately spherical Pt nuclei (about 0.2 μm in diameter) was obtained for both materials. The composition of the Pt nuclei was verified by EDAX analysis. The density of nuclei on the ITO sample was about $3\times10^8$/cm$^2$, which for spherical nuclei of 0.2 μm diameter would block 1% of the light and give a surface area of 4% of the geometric area. The density of the Pt nuclei on the FTO sample was comparable to that for the ITO sample. Adhesion of the Pt nuclei was at least reasonably good since the density remained the same after vigorous water rinsing. These data show that Pt nuclei can be deposited at defect sites on ITO and FTO at a density appropriate for REM counter electrode use. For this nuclei density, larger islands (comprised of Pt and mirror metal) would be used to improve the current carrying capability.

EXAMPLE 2

Platinum was electrodeposited on an ITO film at 0.40 mA/cm$^2$ to 5.2 C/cm$^2$ of charge. From SEM/EDAX analysis, Pt islands that appeared to be roughly spherical (about 0.3 μm diameter) were distributed at a density of $2\times10^8$/cm$^2$ uniformly over the ITO surface. The current carrying capability of this Pt dot matrix array was evaluated by cyclic voltammetry (50 mV/s) in a typical REM electrolyte comprised of 1.5 M AgI and 2.0 M LiBr in gamma-butyrolactone (GBL) solvent. A silver film on a platinized ITO substrate was used as a combination counter electrode and reference electrode. Good performance for the Pt dot matrix electrode up to a current of 2.0 mA/cm$^2$ (geometric area) was indicated by Ag electrodeposition current that increased linearly with negative electrode potential and exhibited very little overvoltage and hysteresis, and by anodic current that decreased to a low value after deposited Ag was electrochemically stripped from the electrode. The integrated charges associated with Ag deposition and stripping were also practically equivalent. In contrast, Ag electrodeposition from the GBL electrolyte on bare ITO involved appreciable overvoltage (>0.1 V) and voltammetric hysteresis, and Ag stripping from bare ITO was typically incomplete (high residual anodic current). In addition, an appreciable amount of silver was lost by deposition on bare ITO (indicated by an appreciable imbalance between the deposition and stripping charges). The apparent current carrying capability measured for the Pt dot matrix electrode (2.0 mA/cm$^2$) is about 50% of that for the REM mirror electrode in this electrolyte (4 mA/cm$^2$). Such good performance for a Pt dot matrix electrode with a small cross-sectional area may be attributable to spherical diffusion effects and increased surface area associated with elongated rather than spherical Ag/Pt islands.

EXAMPLE 3

Platinum was electrodeposited on an ITO film at a constant electrode potential of −0.37 V vs. SCE to 0.80 C/cm$^2$ of charge. SEM/EDAX analysis detected approximately spherical Pt nuclei (about 0.1 μm diameter) at a density of $1\times10^8$/cm$^2$ distributed uniformly over the ITO surface.

EXAMPLE 4

Platinum was electrodeposited on an ITO film at a constant electrode potential of −0.52 V vs. SCE to 8.8 C/cm$^2$ of charge. SEM/EDAX analysis detected approximately spherical Pt nuclei (about 0.1 μm diameter) at a density of $1\times10^9$/cm$^2$ distributed uniformly over the ITO surface.

The preferred embodiments of the present invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

I claim:

1. A method of making a locally distributed electrode, comprising the steps of:
   placing a conducting metallic oxide layer and a first counter electrode in contact with a noble metal electroplating solution; and
   applying a negative potential to the metallic oxide layer relative to the first counter electrode, such that the noble metal is electrodeposited from the solution preferentially at defect sites on a surface of the metallic oxide layer.

2. The method of claim 1, wherein the metallic oxide layer is selected from the group consisting of indium tin oxide, fluorine-doped tin oxide, aluminum-doped zinc oxide, antimony-doped tin oxide, indium oxide, fluorine-doped indium oxide, aluminum-doped tin oxide, phosphorus-doped tin oxide, and indium zinc oxide.

3. The method of claim 1, wherein the metallic oxide layer is disposed on a substrate selected from the group consisting of glasses and plastics.

4. The method of claim 1, wherein the noble metal is selected from the group consisting of platinum, iridium, gold, osmium, palladium, rhenium, rhodium, ruthenium, and alloys thereof.

5. The method of claim 1, wherein the step of applying a negative potential includes the step of maintaining the potential of the metallic oxide layer below a predetermined value.

6. The method of claim 1, wherein the step of applying a negative potential includes the step of maintaining the current flowing between the metallic oxide layer and the first counter electrode below a predetermined value.

7. The method of claim 1, further comprising, prior to the step of placing a conducting metallic oxide layer and a first counter electrode in contact with a noble metal electroplating solution, the step of:
   pretreating the metallic oxide layer to increase the density of the defect sites at which the noble metal is preferentially electrodeposited.

8. The method of claim 7, wherein the step of pretreating the metallic oxide layer includes a step selected from the group consisting of oxygen plasma cleaning, sputter cleaning, mechanical abrading, and chemical etching.

9. The method of claim 1, further comprising, prior to the step of placing a conducting metallic oxide layer and a first counter electrode in contact with a noble metal electroplating solution, the step of:
   annealing the metallic oxide layer at an elevated temperature to decrease the density of the defect sites at which the noble metal is preferentially electrodeposited.

10. The method of claim 1, further comprising, after the step of applying a negative potential to the metallic oxide layer relative to the first counter electrode, the step of:
    applying a cathodic potential pulse to the metallic oxide layer relative to the first counter electrode such that the noble metal is electrodeposited on the metallic oxide layer at sites other than the defect sites.

11. The method of claim 1, furthering comprising, after the step of applying a negative potential to the metallic oxide layer relative to the first counter electrode, the step of:
    heat treating the locally distributed electrode.

12. The method of claim 1, further comprising, after the step of applying a negative potential to the metallic oxide layer relative to the first counter electrode, the step of:
    applying a layer of an insulating metallic oxide to the surface of the conducting metallic oxide layer on the locally distributed electrode.

13. The method of claim 1, further comprising the steps of:
    placing the locally distributed electrode and a second counter electrode in contact with a solution for electroplating a non-noble metal; and
    applying a negative potential to the locally distributed electrode relative to the second counter electrode, such that the non-noble metal is electrodeposited from the solution preferentially on the noble metal electrodeposited at defect sites on the surface of the metallic oxide layer.

14. The method of claim 13, wherein the non-noble metal is selected from the group consisting of silver, bismuth, copper, tin, cadmium, mercury, indium, lead, antimony, thallium, zinc, and alloys thereof.

15. A method of making a locally distributed electrode, comprising the steps of:
    placing a conducting metallic oxide layer and a counter electrode in contact with a noble metal electroplating solution;
    applying a negative potential to the metallic oxide layer relative to the counter electrode, such that the noble metal is electrodeposited from the solution preferentially at defect sites on a surface of the metallic oxide layer; and
    heat treating the locally distributed electrode.

16. A locally distributed electrode, comprising:
    a conducting metallic oxide layer, including a surface having a plurality of defect sites; and
    a plurality of noble metal deposits preferentially disposed on the surface at the defect sites, such that the noble metal deposits define the locally distributed electrode.

17. The locally distributed electrode of claim 16, wherein the metallic oxide layer is selected from the group consisting of indium tin oxide, fluorine-doped tin oxide, aluminum-doped zinc oxide, antimony-doped tin oxide, indium oxide, fluorine-doped indium oxide, aluminum-doped tin oxide, phosphorus-doped tin oxide, and indium zinc oxide.

18. The locally distributed electrode of claim 16, wherein the metallic oxide layer is disposed on a substrate selected from the group consisting of glasses and plastics.

19. The locally distributed electrode of claim 16, wherein the noble metal is selected from the group consisting of platinum, iridium, gold, osmium, palladium, rhenium, rhodium, ruthenium, and alloys thereof.

20. The locally distributed electrode of claim 16, further comprising:
    a plurality of non-noble metal deposits preferentially disposed on the noble metal deposits.

21. The locally distributed electrode of claim 20, wherein the non-noble metal deposits comprise a metal selected from the group consisting of silver, bismuth, copper, tin, cadmium, mercury, indium, lead, antimony, thallium, zinc, and alloys thereof.

22. The locally distributed electrode of claim 16, further comprising:
    a layer of an insulating metallic oxide disposed on the layer of conducting metallic oxide.

* * * * *